No. 867,152. PATENTED SEPT. 24, 1907.
V. L. RAVEN.
RAILWAY SIGNALING APPARATUS.
APPLICATION FILED APR. 23, 1907.

2 SHEETS—SHEET 1.

Witnesses
Inventor
V. L. Raven
Attorney

No. 867,152. PATENTED SEPT. 24, 1907.
V. L. RAVEN.
RAILWAY SIGNALING APPARATUS.
APPLICATION FILED APR. 23, 1907.

2 SHEETS—SHEET 2.

Witnesses
W Henry Simms
E. Clough

Inventor
V. L. Raven
Attorney

UNITED STATES PATENT OFFICE.

VINCENT LITCHFIELD RAVEN, OF DARLINGTON, ENGLAND.

RAILWAY SIGNALING APPARATUS.

No. 867,152.           Specification of Letters Patent.           Patented Sept. 24, 1907.

Application filed April 23, 1907. Serial No. 369,882.

*To all whom it may concern:*

Be it known that I, VINCENT LITCHFIELD RAVEN, a subject of the King of Great Britain and Ireland, residing at Darlington, in the county of Durham, England, have invented Improvements in Railway Signaling Apparatus, of which the following is a specification.

For enabling the driver of a locomotive engine to determine the position of the line signals designed to control the working of the line over which his engine or train is to travel, it has heretofore been proposed to provide on the engine audible and visual signals that are brought into action and put out of action for respectively indicating danger and line clear by metal bars arranged on the track in rear of the line signal, or each line signal, to be indicated and the action of one or more of which is under the control of a signalman, the operation of the said audible and visual signal being effected by the closing of electric circuits by brushes or equivalent means on the engine moving in contact with or so as to be influenced by the bar or bars.

Various arrangements of railway signaling apparatus of the kind referred to are described in the specifications of other applications for Letters Patent filed by me dated April 18th 1907 and April 23rd 1907 and numbered respectively 368,897 and 369,881.

Now the present invention has for object to provide supplementary means for causing the signals on the engine to act so that should the contact brushes or equivalent mounted on the engine and designed to work in contact with or under the influence of the metal bars on the track designed to give a danger signal, fail for any reason, to give a danger signal, such a signal will nevertheless be given on the engine at the required parts of the line. For this purpose there is or are mounted on the engine, one or more circuit closing devices adapted to fulfil the same functions as the ordinary brushes or their equivalent, and on the line, in proximity to the line signal or signaling point, or each line signal or signaling point, is or are placed one or more devices adapted to operate such circuit closing device or devices.

Figure 1:
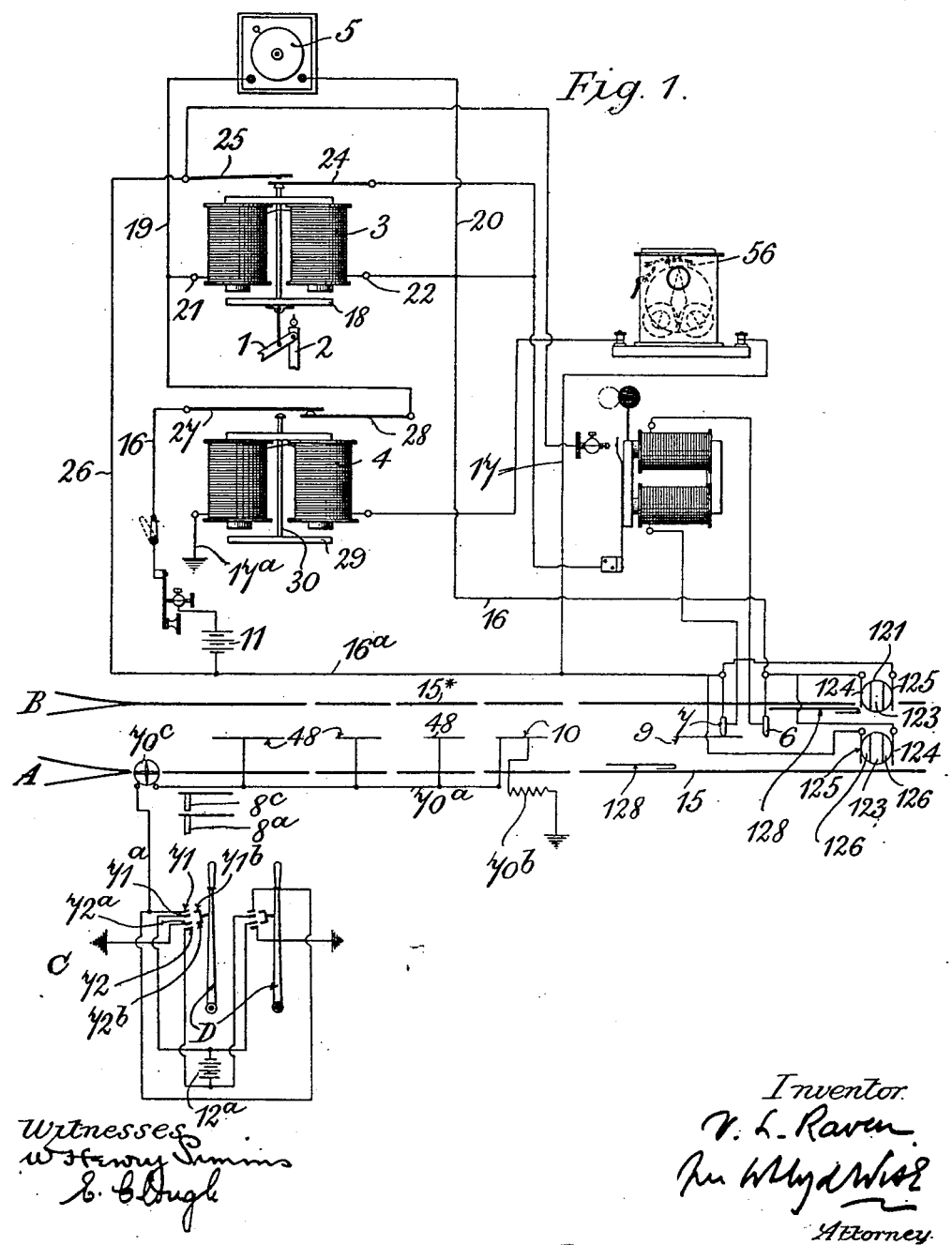
Figure 2:
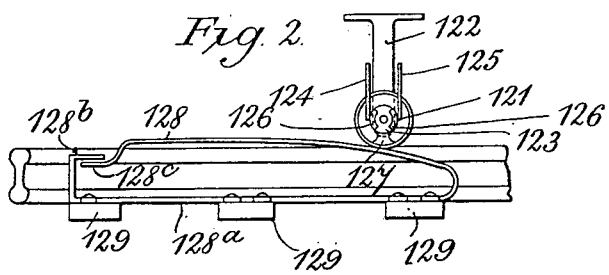
Figure 3:
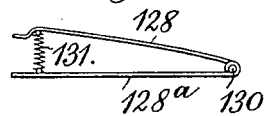
Figure 4:
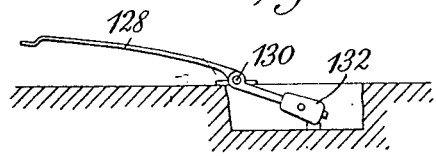

In the accompanying illustrative drawings, Figure 1 shows diagrammatically, railway signaling apparatus of the type described in my said former specifications and specifically the particular arrangement of such apparatus shown and described in my said secondly mentioned former application, together with supplementary means according to the present invention for insuring the bringing into action of the signals on the engine. Fig. 2 shows in side elevation and to larger scale than Fig. 1, one of the supplementary circuit closing devices and a yielding bar for operating the same. Figs. 3 and 4 show modified forms of yielding bars for the purpose mentioned.

1 is the visual signal carried by a post 2; 3 the main magnet; 4 the releasing magnet; 5 the bell or audible signal; 6 and 7 brushes; 11 an electric battery having one pole connected by the conductor $16^a$ to the brush 7 and its other pole connected to the other brush 6 through the main magnet 3 by means of the conductors 16 and supplementary switch 27—28; 19 and 20 conductors by which the bell 5 is connected in a shunt to the terminals 21 and 22 of the main magnet; 24 and 25 a second supplementary switch and 26 a conductor forming together a supplementary circuit for maintaining the circuit of the main magnet 3 and bell 5 closed after the brushes 6 and 7 have been short circuited, and 17 $17^a$ conductors by which the releasing magnet 4 is connected to the brush 7 and to earth through the frame of the engine, the above mentioned parts being on the engine.

9 and 10 are bars fixed on the track and over and in contact with which the brushes 6 and 7 work, and 15 $15^\times$ are the track rails.

The several parts above mentioned are arranged and operate in the manner described in my first mentioned former specification No. 368897 in connection with Fig. 2 thereof, except as to the way in which bar 10 is connected to earth, and that the circuit of the releasing magnet 4 is, in the present instance, shown as being completed through a polarized indicating device 56 for indicating which of the two home signals $8^a$, $8^c$ at a junction of two lines A and B may have been pulled "off", as described in my said first mentioned former specification in connection with Fig. 5 thereof.

In the present example, bar 10 is arranged to be connected, as described in my said secondly mentioned former specification, through a wire $70^a$ and one set of contacts 71, $71^a$ and $71^b$ of a double line switch to one pole of a battery $12^a$ the other pole of which is adapted to be connected to earth through another set of contacts 72, $72^a$ and $72^b$, the bar 10 being also connected to earth through a resistance $70^b$. The line switch and battery 12 are arranged in the signaling cabin at C and the movable contacts $71^b$ and $72^b$ of the double line switch are insulated from each other and carried by the hand lever D used for working the home signal. The arrangement is such that when the home signal is at danger and the corresponding hand lever D is consequently in its normal or inoperative position shown, the double line switch 71—$72^b$ will be open and the bar 10 will act like the bar 9 to maintain the visual and audible signals 1 and 5 on the engine in the danger condition, but upon moving the home signal into the "line clear" position by the hand lever D, the movable contacts $71^b$ and $72^b$ will be inserted between the fixed contacts 71—$71^a$ and 72—$72^a$ respectively so as to connect the insulated bar 10 through the battery $12^a$ to earth, so that upon the brush 7 coming into contact with the said bar, the circuit of the said battery will be completed through the releasing magnet 4 and earth, and the armature 29 and rod 30 of such magnet will be caused to open the supplementary switch 27—28 and so open the circuit of the main magnet 3 and bell 5 and put the visual and audible signals 1 and 5 on the engine out of operation.

At a railway junction, as in the arrangement shown, there would be a double switch, such as described, for each of the two hand levers D, that for one hand lever being arranged to cause current to flow in one direction through the releasing magnet 4 and polarized indicating device 56, and that for the other hand lever being arranged, as shown, to cause current to flow from the battery in the reverse direction through the releasing magnet 4 and polarized indicating device 56, so that the engine driver can determine for which line A or B the home signal has been pulled off.

70° is an indicating device arranged in the circuit of the conductor 70ª for indicating the passage of an electric current and the direction thereof through the said conductor. The resistance 70ᵇ serves to reduce the current flowing through the circuit of the battery 12 after the hand lever D, or one of the hand levers, has been moved into the "line clear" position and the brush 7 is out of contact with the bar 10.

48 are intermediate bars connected to the conductor 70ª and arranged between the bar 10 and the home signal 8ª, or signals 8ª, 8ᶜ, to enable the signals 1 and 5 on the engine to be returned to the inoperative or normal condition upon moving the home signal into the "line clear" position after the engine has passed over bar 10 so as to obviate the necessity of the engine being brought to rest unnecessarily, all as described in my secondly mentioned former specification.

Each circuit closing device provided according to the present invention for performing the same functions as the ordinary brushes 6 and 7, or their equivalent, comprises, in the example shown in Figs. 1 and 2, a rotary switch carrier 121 mounted to rotate in a support or bearing 122 fixed to the underside of the engine and carrying an insulated rotary contact 123, adapted, upon rotation, to bridge or connect two insulated and stationary spring contacts 124 and 125, and two oppositely arranged pieces 126 of insulating material against which the said spring contacts can bear so as to be then electrically disconnected from each other, the two spring contacts 124 and 125 being connected to the conductors 16 and 16ª respectively to which the brushes 6 and 7 (or equivalent) are respectively connected. The carrier 121 is so weighted, as by a mass 127 of metal, that it normally assumes a position in which the pieces 126 of insulating material are, as shown, in connection with the spring contacts 124 and 125 so as to open the circuit between the latter.

Upon the railway line in the neighborhood of bar 9, or each bar 9, and preferably near one or each of the track rails 15, 15ˣ, is arranged a stationary inclined or doubly inclined bar 128, or two or more such bars spaced apart one behind the other, and over which, or each of which the rotary switch carrier 121 of the corresponding circuit closing device can roll when the engine passes this part of the line. The arrangement is such that upon the engine running over such part of the line, the carrier 121, or each such carrier, will be caused by the inclined bar 128, or each inclined bar, to rotate so as to cause the rotary contact 123 to intermittently short circuit the adjacent spring contacts 124 and 125 and insure the bringing into operation of the signaling apparatus on the engine, whether the contact brushes 6 and 7, or equivalent, be effective or not, the weighted switch carrier 121 automatically assuming its circuit opening position when it has passed the inclined bar or bars. In the example there are inclined spring bars 128 adjacent to both track rails 15, 15ˣ and two rotary contacts on the engine for use therewith.

The inclined bar, or each of such bars, may advantageously be made as a spring or vertically yielding bar. For this purpose, a metal bar may be so bent, as shown in Fig. 2, as to form a lower portion 128ª that is fixed on the track, as to the sleepers 129, and has an upwardly bent portion carrying a horizontally bent portion 128ᵇ to form a catch or stop, and an upper spring or yielding portion 128 that is inclined to the horizontal, or, preferably, is made of convex shape, as shown, this portion being arranged over the lower portion 128ª, and having its free end 128ᶜ located below the other end portion 128ᵇ of the bar forming the stop. Such a spring or yielding bar may be variously constructed. For example, the fixed lower portion 128ª and the movable upper portion 128 may, as shown in Fig. 3 be made separate from each other and be pivoted together at one end, as at 130, and be forced apart by an interposed spring 131. Or the yielding bar 128 may, as shown in Fig. 4, be a pivoted one, provided with a counterweight 132 for normally holding it in position and for allowing it to yield in a downward direction. Such spring or yielding bars can be used for operating various devices on an engine other than a circuit closing device, as for example steam or other whistles or valve operating gear.

The application of supplementary circuit closing devices according to the present invention to other arrangements of railway signaling apparatus of the kind herein referred to will be readily understood without further description.

Having now particularly described and ascertained the nature of the said invention and in what manner the same is to be performed I declare that what I claim is:—

1. In a railway electrical signaling system, the combination with a track, a vehicle to travel thereon, electrically operated signaling apparatus arranged in a normally open circuit on said vehicle and adapted when brought into action by the closing of said circuit to indicate danger, and circuit closing means located on the track for closing said circuit when the vehicle passes over the same, of a supplementary circuit closing device mounted on the vehicle for insuring the closing of said normally open circuit if it be not closed by the circuit closing means on the track, and means arranged on the track, in the neighborhood of the circuit closing means thereon, for bringing said supplementary circuit closing device into action when the vehicle passes over the same.

2. In a railway electrical signaling system, the combination with a track, a vehicle to travel thereon, electrically operated signaling apparatus arranged in a normally open circuit on said vehicle and adapted when brought into action by the closing of said circuit to indicate danger, and circuit closing means located on the track for closing said circuit when the vehicle passes over the same, of a supplementary circuit closing device comprising stationary and movable switch members mounted on said vehicle and adapted when in connection with each other to close said circuit, and means arranged on said track, in the neighborhood of the circuit closing means thereon, for bringing said switch members into connection with each other when the vehicle passes over said part of the track.

3. In a railway electrical signaling system, the combination with a track, a vehicle to travel thereon, electrically operated signaling apparatus arranged in a normally open circuit on said vehicle and adapted when brought into action by the closing of said circuit to indicate danger, and circuit closing means located on the track for closing said circuit when the vehicle passes over the same, of a supplementary circuit closing device on said vehicle comprising stationary and movable switch members, the stationary switch members being connected to said circuit, a carrier for the movable switch member, and means arranged on the track in the neighborhood of the circuit closing means thereon, for actuating said carrier and movable switch member to close said circuit.

4. In a railway electrical signaling system, the combination with a track, a vehicle to travel thereon, electrically operated signaling apparatus arranged in a normally open circuit on said vehicle and adapted when brought into action by the closing of said circuit to indicate danger, and circuit closing means located on the track for closing said circuit when the vehicle passes over the same, of a supplementary circuit closing device on said vehicle comprising stationary and movable switch members, the stationary switch members being connected to said circuit, a carrier for the movable switch member mounted to rotate on said vehicle and bring the movable switch member into connection intermittently with the stationary switch members and short circuit said circuit, means arranged on the track in the neighborhood of the circuit closing means thereon, for rotating said switch carrier when the same moves over it, and means for automatically moving the rotary carrier and switch member into an inoperative position after passing over the carrier rotating means.

5. In a railway electrical signaling system, the combination with a track, a vehicle to travel thereon, electrically operated signaling apparatus arranged in a normally open circuit on said vehicle and adapted when brought into action by the closing of said circuit to indicate danger, and circuit closing means located on the track for closing said circuit when the vehicle passes over the same, of a supplementary circuit closing device comprising stationary and movable switch members mounted on said vehicle and adapted when in connection with each other to close said circuit, and a bar arranged longitudinally on the track in the neighborhood of the circuit closing means thereon and adapted to actuate the movable switch member, to close said circuit, against a force tending to move it into the inoperative position.

6. In a railway electrical signaling system, the combination with a track, a vehicle to travel thereon, electrically operated signaling apparatus arranged in a normally open circuit on said vehicle and adapted when brought into action by the closing of said circuit to indicate danger, and circuit closing means located on the track for closing said circuit when the vehicle passes over the same, of a supplementary circuit closing device comprising stationary and movable switch members mounted on said vehicle and adapted when in connection with each other to close said circuit, a vertically yielding bar arranged longitudinally on the track in the neighborhood of the circuit closing means thereon and adapted to actuate the movable switch member, to close said circuit, against a force tending to move it into the inoperative position.

7. In a railway electrical signaling system, the combination with a track, a vehicle to travel thereon, electrically operated signaling apparatus arranged in a normally open circuit on said vehicle and adapted when brought into action by the closing of said circuit to indicate danger, and circuit closing means located on the track for closing said circuit when the vehicle passes over the same, of a supplementary circuit closing device on said vehicle comprising stationary and movable switch members, the stationary switch members being connected to said circuit, a carrier for the movable switch member mounted to rotate on said vehicle and bring the movable switch member into connection intermittently with the stationary switch members and short-circuit said circuit, and a bar arranged longitudinally on the track in the neighborhood of the circuit closing means thereon and adapted to rotate said carrier and close said circuit when the vehicle passes over said bar, said carrier being weighted so as to adapt it to return to an inoperative position after passing said bar.

8. In a railway electrical signaling system, the combination with a track, a vehicle to travel thereon, electrically operated signaling apparatus arranged in a normally open circuit on said vehicle and adapted when brought into action by the closing of said circuit to indicate danger, and circuit closing means located on the track for closing said circuit when the vehicle passes over the same, of a supplementary circuit closing device on said vehicle comprising stationary and movable switch members, the stationary switch members being connected to said circuit, a weighted carrier for the movable switch member mounted to rotate on said vehicle and bring the movable switch member into connection intermittently with the stationary switch members and short-circuit said circuit, and a vertically yielding inclined bar arranged longitudinally on the track in the neighborhood of the circuit closing means so that said carrier will roll thereon when the vehicle passes over it and close said circuit in an intermittent manner.

9. In a railway electrical signaling system, the combination with a track, a vehicle to travel thereon, electrically operated signaling apparatus arranged in a normally open circuit on said vehicle and adapted when brought into action by the closing of said circuit to indicate danger, and circuit closing means located on the track for closing said circuit when the vehicle passes over the same, of a supplementary circuit closing device on said vehicle comprising stationary and movable switch members, the stationary switch members being connected to said circuit, a weighted carrier for the movable switch member mounted to rotate on said vehicle and bring the movable switch member into connection intermittently with the stationary switch members and short-circuit said circuit, and a plurality of vertically yielding inclined bars arranged longitudinally on the track in the neighborhood of the circuit closing means and to successively rotate said carrier, when the vehicle passes over them, and close said circuit in an intermittent manner.

10. In a railway electrical signaling system, the combination with a track, a vehicle to travel thereon, electrically operated signaling apparatus arranged in a normally open circuit on the vehicle and adapted when brought into action by the closing of said circuit to continue in action and thereby indicate danger, means arranged at one part of said track for automatically bringing said signaling apparatus into action to indicate danger when the vehicle passes over such part of the track, and means under the control of a signalman whereby upon the vehicle passing over another part of the track in advance of the first mentioned part, after a line signal has been operated to indicate line clear, the said signaling apparatus can be put out of action and thereby indicate line clear, of a supplementary circuit closing device mounted on the vehicle for insuring the closing of said normally open circuit if it be not closed by the circuit closing means on the track, and means arranged on the track, in the neighborhood of the circuit closing means thereon, for bringing said supplementary circuit closing means into action when the vehicle passes over the same.

11. In a railway electrical signaling system, the combination with a track, a vehicle to travel thereon, electrically operated signaling apparatus arranged in a normally open circuit on the vehicle and adapted when brought into action by the closing of said circuit to continue in action and thereby indicate danger, means arranged at one part of said track for automatically bringing said signaling apparatus into action to indicate danger when the vehicle passes over such part of the track, and means under the control of a signalman whereby upon the vehicle passing over another part of the track in advance of the first mentioned part, after a line signal has been operated to indicate line clear, the said signaling apparatus can be put out of action and thereby indicate line clear, of a supplementary circuit closing device on said vehicle comprising stationary and movable switch members, the stationary switch members being connected to said circuit, a carrier for the movable switch member, and means arranged on the track in the neighborhood of the circuit closing means thereon, for actuating said carrier and movable switch member to close said circuit.

12. In a railway electrical signaling system, the combination with a track, a vehicle to travel thereon, electrically operated signaling apparatus arranged in a normally open circuit on the vehicle and adapted when brought into action by the closing of said circuit to continue in action and thereby indicate danger, contacts connected to the terminals of said circuit, a bar arranged at one part of said track for automatically short-circuiting said contacts and closing said circuit when the vehicle moves over said bar, an electro-magnetic device arranged in a second normally open circuit on the vehicle and adapted on the closing of said second circuit to open the first circuit, a second bar arranged on the track in advance of the first bar, and means under the control of a signalman whereby said second circuit can be closed through said second bar after a line signal has been operated to indicate line clear, of a supplementary circuit closing device on said vehicle comprising stationary and movable switch members, the stationary switch members being connected to the same parts of the first mentioned circuit as said contacts, a weighted carrier for the movable switch member mounted to rotate on said vehicle and bring the movable switch member into connection intermittently with the stationary switch members and short-circuit the first mentioned circuit, and a third vertically movable bar arranged longitudinally on the track in the neighborhood of the first mentioned bar and adapted to rotate said carrier and close the first mentioned circuit through said stationary switch contacts when the vehicle passes over said third bar.

Signed at Newcastle-on-Tyne, England, this ninth day of April 1907.

VINCENT LITCHFIELD RAVEN.

Witnesses:
W. H. NIXON,
ARTHUR C. STAMER.